US012014184B2

(12) United States Patent
Song

(10) Patent No.: US 12,014,184 B2
(45) Date of Patent: Jun. 18, 2024

(54) ARITHMETIC DEVICES FOR NEURAL NETWORK INCLUDING AN INPUT DISTRIBUTION SIGNAL GENERATION CIRCUIT, AN OUTPUT DISTRIBUTION SIGNAL GENERATION CIRCUIT, AND AN OUTPUT DISTRIBUTION SIGNAL COMPENSATION CIRCUIT

(71) Applicant: SK hynix Inc., Icheon-si (KR)

(72) Inventor: Choung Ki Song, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 840 days.

(21) Appl. No.: 16/932,400

(22) Filed: Jul. 17, 2020

(65) Prior Publication Data

US 2021/0132953 A1 May 6, 2021

Related U.S. Application Data

(63) Continuation-in-part of application No. 16/919,786, filed on Jul. 2, 2020.
(Continued)

(30) Foreign Application Priority Data

Oct. 31, 2019 (KR) .......................... 10-2019-0138114
Dec. 4, 2019 (KR) .......................... 10-2019-0160238

(51) Int. Cl.
*G06F 9/38* (2018.01)
*G06F 7/487* (2006.01)
(Continued)

(52) U.S. Cl.
CPC .......... *G06F 9/3893* (2013.01); *G06F 7/4876* (2013.01); *G06F 7/5443* (2013.01);
(Continued)

(58) Field of Classification Search
CPC ............ G06F 17/16; G06F 2207/4824; G06F 7/4876; G06F 7/5443; G06F 9/223;
(Continued)

(56) References Cited

U.S. PATENT DOCUMENTS 5,181,184 A  1/1993  Shim et al.
6,414,687 B1 7/2002  Gibson
(Continued)

FOREIGN PATENT DOCUMENTS

CN  108736876 A  11/2018
DE  19942144 A1  6/2001
(Continued)

*Primary Examiner* — Brent Johnston Hoover
(74) *Attorney, Agent, or Firm* — WILLIAM PARK & ASSOCIATES LTD.

(57) ABSTRACT

An arithmetic device includes an input distribution signal generation circuit, an output distribution signal generation circuit, and an output distribution signal compensation circuit. The input distribution signal generation circuit generates an input distribution signal and a compensation signal based on an arithmetic result signal generated from a result of a multiplying-accumulating (MAC) calculation. The output distribution signal generation circuit applies the input distribution signal to an activation function to generate first and second output distribution signals. The output distribution signal compensation circuit compensates for the first output distribution signal based on the compensation signal, (Continued)

the first output distribution signal, and the second output distribution signal to generate a compensated distribution signal.

20 Claims, 16 Drawing Sheets

Related U.S. Application Data

(60) Provisional application No. 62/959,593, filed on Jan. 10, 2020, provisional application No. 62/959,574, filed on Jan. 10, 2020, provisional application No. 62/958,609, filed on Jan. 8, 2020, provisional application No. 62/958,614, filed on Jan. 8, 2020.

(51) Int. Cl.
    *G06F 7/544*     (2006.01)
    *G06F 9/22*     (2006.01)
    *G06F 9/30*     (2018.01)
    *G06F 17/16*     (2006.01)
    *G06N 3/063*     (2023.01)

(52) U.S. Cl.
    CPC ............ *G06F 9/223* (2013.01); *G06F 9/3001* (2013.01); *G06F 17/16* (2013.01); *G06N 3/063* (2013.01); *G06F 2207/4824* (2013.01)

(58) Field of Classification Search
    CPC ..... G06F 9/3001; G06F 9/3893; G06N 3/048; G06N 3/063
    See application file for complete search history.

(56) References Cited

U.S. PATENT DOCUMENTS

| | | |
|---|---|---|
| RE42,643 E | 8/2011 | Oshima et al. |
| 9,559,836 B1 | 1/2017 | Hata |
| 10,592,247 B2 | 3/2020 | Tanaka |
| 2013/0041859 A1 | 2/2013 | Esterlilne |
| 2014/0376676 A1 | 12/2014 | Schafferer |
| 2017/0365306 A1 | 12/2017 | Ouyang et al. |
| 2018/0373977 A1 | 12/2018 | Carbon et al. |
| 2019/0042922 A1 | 2/2019 | Pillai et al. |
| 2019/0080223 A1 | 3/2019 | Fraser et al. |
| 2019/0147323 A1 | 5/2019 | Li et al. |
| 2019/0149315 A1 | 5/2019 | Suzuki et al. |
| 2021/0004208 A1 | 1/2021 | Lai et al. |
| 2021/0365241 A1* | 11/2021 | Huang .................... H03M 3/04 |
| 2022/0276837 A1* | 9/2022 | Fujinami ................ G06N 3/065 |

FOREIGN PATENT DOCUMENTS

| | | |
|---|---|---|
| EP | 0575716 A1 | 12/1993 |
| GB | 2234374 A | 1/1991 |
| JP | 2010050609 A | 3/2010 |
| KR | 1020180053314 A | 5/2018 |
| KR | 20180070187 A | 6/2018 |
| KR | 1020190054454 A | 5/2019 |
| KR | 102032146 B1 | 10/2019 |
| KR | 1020190116024 A | 10/2019 |

* cited by examiner

FIG.14

| IDST<4:1> | ODST |
|---|---|
| '0001' ('1') | Y1 |
| '0010' ('2') | Y2 |
| ⋮ | ⋮ |
| '1001' ('9') | Y9 (ODST1) |
| '1010' ('10') | Y10 (ODST2) |
| ⋮ | ⋮ |
| '1111' ('15') | Y15 |

ARITHMETIC DEVICES FOR NEURAL NETWORK INCLUDING AN INPUT DISTRIBUTION SIGNAL GENERATION CIRCUIT, AN OUTPUT DISTRIBUTION SIGNAL GENERATION CIRCUIT, AND AN OUTPUT DISTRIBUTION SIGNAL COMPENSATION CIRCUIT

CROSS-REFERENCE TO RELATED APPLICATIONS

The present application claims priority under 35 U.S.C 119(a) to Korean Application No. 10-2019-0160238, filed on Dec. 4, 2019, and this application is a continuation-in-part of U.S. patent application Ser. No. 16/919,786, filed on Jul. 2, 2020, which claims priority under 35 U.S.C 119(a) to Korean Application No. 10-2019-0138114, filed on Oct. 31, 2019, Provisional Patent Application No. 62/958,614, filed on Jan. 8, 2020, Provisional Patent Application No. 62/958,609, filed on Jan. 8, 2020, Provisional Patent Application No. 62/959,574, filed on Jan. 10, 2020, and Provisional Patent Application No. 62/959,593, filed on Jan. 10, 2020, which is incorporated herein by reference in its entirety.

BACKGROUND

1. Technical Field

Embodiments of the present disclosure generally relate to arithmetic devices for a neural network.

2. Related Art

In a neural network, neurons mathematically modelled to resemble to a human brain are connected to each other to form a network. Recently, neural network technologies have been developed fast. Accordingly, a lot of effort has been focused on analyzing input data and extracting useful information using the neural network technologies in various electronic devices.

SUMMARY

According to an embodiment, an arithmetic device includes an input distribution signal generation circuit, an output distribution signal generation circuit, and an output distribution signal compensation circuit. The input distribution signal generation circuit generates an input distribution signal and a compensation signal from an arithmetic result signal generated based on a result of a multiplying-accumulating (MAC) calculation. The output distribution signal generation circuit applies the input distribution signal to an activation function to generate a first output distribution signal and a second output distribution signal. The output distribution signal compensation circuit compensates for the first output distribution signal based on the compensation signal, the first output distribution signal, and the second output distribution signal to generate a compensated distribution signal.

According to another embodiment, an arithmetic device includes a MAC circuit and an AF circuit. The MAC circuit is configured to be allocated to the bank, configured to perform a multiplying-accumulating (MAC) calculation to generate an input distribution signal and a compensation signal. The AF circuit is configured to apply the input distribution signal to an activation function to generate an output distribution signal, and configured to compensate for the output distribution signal based on the compensation signal to generate a compensated distribution signal.

According to yet another embodiment, an arithmetic device includes an output distribution signal generation circuit and an output distribution signal compensation circuit. The output distribution signal generation circuit is configured to apply an input distribution signal to the activation function to generate a first output distribution signal and a second output distribution signal. The output distribution signal compensation circuit configured to compensate for the first output distribution signal based on the compensation signal, the first output distribution signal, and the second output distribution signal to generate a compensated distribution signal.

BRIEF DESCRIPTION OF THE DRAWINGS

FIG. 14 is a table, illustrating an operation of the output distribution signal generation circuit, shown in FIG. 13.

DETAILED DESCRIPTION

In the following description of the embodiments, when a parameter is referred to as being "predetermined", it may be intended to mean that a value of the parameter is determined in advance when the parameter is used in a process or an algorithm. The value of the parameter may be set when the process or the algorithm starts or may be set during a period that the process or the algorithm is executed.

It will be understood that although the terms "first", "second", "third" etc. are used herein to describe various elements, these elements should not be limited by these terms. These terms are only used to distinguish one element from another element. Thus, a first element in some embodiments could be termed a second element in other embodiments without departing from the teachings of the present disclosure.

Further, it will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A logic "high" level and a logic "low" level may be used to describe logic levels of electric signals. A signal having a logic "high" level may be distinguished from a signal having a logic "low" level. For example, when a signal having a first voltage correspond to a signal having a logic "high" level, a signal having a second voltage correspond to a signal having a logic "low" level. In an embodiment, the logic "high" level may be set as a voltage level which is higher than a voltage level of the logic "low" level. Meanwhile, logic levels of signals may be set to be different or opposite according to the embodiments. For example, a certain signal having a logic "high" level in one embodiment may be set to have a logic "low" level in another embodiment.

Various embodiments of the present disclosure will be described hereinafter with reference to the accompanying drawings. However, the embodiments described herein are for illustrative purposes only and are not intended to limit the scope of the present disclosure.

Figure 1:
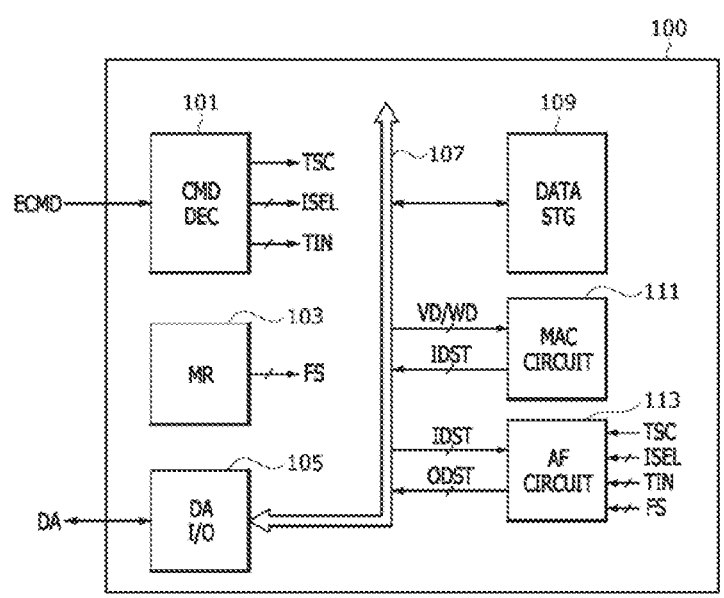
FIG. 1 is a block diagram illustrating a configuration of an arithmetic device according to an embodiment of the present disclosure.

As illustrated in FIG. 1, an arithmetic device 13 may include command decoder 101, a mode register 103, a data input/output circuit 105, a data line 107, a data storage circuit 109, a MAC circuit 111 and an AF circuit 113.

The command decoder 101 may generate a table set signal TSC, an input selection signal ISEL, and a table input signal TIN based on an external command ECMD. The number of bits included in the input selection signal ISEL may be set to be different according to the embodiments. The number of bits included in the table input signal TIN may be set to be different according to the embodiments.

The command decoder 101 may decode external command ECMD to generate the table set signal TSC. The table set signal TSC may be activated to store an activation function used for a neural network into a first table storage circuit (133 of FIG. 3) in a look-up table form. The number of bits included in the external command ECMD for activating the table set signal TSC may be set to be different according to the embodiments. In addition, a logic level combination of the external command ECMD for activating the table set signal TSC may be set to be different according to the embodiments. The lookup table has a table form that contains information about an input value and the output value corresponding to the input value. When using the lookup table, the output value corresponding to the input value can be printed directly without any arithmetic, thus improving the arithmetic speed.

The command decoder 101 may decode the external command ECMD to generate the input selection signal ISEL and the table input signal TIN. The input selection signal ISEL and the table input signal TIN may be generated to store the activation function into first to $N^{th}$ variable latches (149_1~149_N of FIG. 4) included in the first table storage circuit (133 of FIG. 3) in a look-up table form. The table input signal TIN may be stored into one variable latch selected by the input selection signal ISEL among the first to $N^{th}$ variable latches (149_1~149_N of FIG. 4). A logic level combination of the external command ECMD for setting logic level combinations of the table input signal TIN may be set to be different according to the embodiments. A logic level combination of the external command ECMD for setting logic level combinations of the input selection signal ISEL may be set to be different according to the embodiments.

The mode register 103 may store a function selection signal FS through a mode register set. The mode register 103 may output the function selection signal FS through a mode register read. The mode register set and the mode register read are common operations for the mode register 139, so the specific description is omitted. The mode register 103 may apply the function selection signal FS to the AF circuit 113. The function selection signal FS may be generated to select one of various activation functions which are used for a neural network. The various activation functions used for a neural network may include, but are not limited to, sigmoid sigmoid function), Tanh (i.e., hyperbolic tangent activation function), ReLU (i.e., rectified linear unit function), leaky ReLU (i.e., leaky rectified linear unit function), Maxout (i.e., max out activation function), and an activation function which is inputted based on the external command ECMD. The number of bits included in the function selection signal FS may be set to be different according to the embodiments. The mode register 103 can be located on the external side of the arithmetic device 13, for example, on a host or a memory controller.

The data input/output circuit 105 may receive external data DA from the external side of the arithmetic device 13, and transmit the external data DA to at least one of the data storage circuit 109 and the MAC circuit 111 through the data line 107. The data input/output circuit 105 may output data from at least one of the data storage circuit 109, the MAC circuit 111 and the AF circuit 113 through the data line 107 to the external data DA.

The data storage circuit 109 may be stored internally by receiving the external data DA received from the data input/output circuit 105 through the data line 107 in a write operation. The data storage circuit 109 may transmit the data stored internally to the data input/output circuit 105 through the data line 107 and output it to the external data DA in read operation.

The MAC circuit 111 may receive vector data VD and weight data WD, The MAC circuit 111 may receive the vector data VD from the data input/output circuit 105 or data storage circuit 109. The MAC circuit 111 may receive the weight data WD from the data input/output circuit 105 or data storage circuit 109. The MAC circuit 111 may perform MAC arithmetic operation on the vector data VD and the weight data WD, and generate an input distribution signal IDST based on the results of MAC arithmetic operation.

The MAC arithmetic operation may include a multiplying operation and an accumulating operation for the vector data VD and the weight data WD. When the vector data VD and the weight data WD are implemented in matrix format, the MAC arithmetic operations may include multiple multiplying operations and multiple accumulating operations for elements contained in matrix with the vector data VD implemented and elements contained in matrix with the weight data WD implemented. In the neural network, the MAC arithmetic operations are performed to classify features contained in an input layer into resulting values contained in an output layer. The vector data VD may contain information about features contained in the Input layer. The weight data WD may contain information about the influence on classifying features of the input layers as results contained in the output layers. The MAC circuit 111 may receive an output distribution signal ODST from the AF circuit 113 as the vector data VD when multiple layers are applied in perceptron.

The AF circuit 113 may store the activation functions used for a neural network into the first table storage circuit (133 of FIG. 3) in a look-up table form, based on the table set signal TSC, the input selection signal ISEL, and the table input signal TIN. The lookup table stored in the AF circuit 113 includes information on the relationship between the input distribution signal IDST and the output distribution signal ODST. The output distribution signal ODST can be defined as the value derived when the input distribution signal IDST is applied to an activation function. The AF circuit 113 may store the table input signal TIN into one variable latch selected by the input selection signal ISEL among the first to $N^{th}$ variable latches (149_1~149_N of FIG. 4) when the table set signal TSC is activated. Various activation functions used for a neural network, for example, sigmoid, Tanh, ReLU, leaky ReLU, and Maxout may be hardwired into the AF circuit 113, The number of the activation functions hardwired in the AF circuit 113 may be set to be different according to the embodiments.

The AF circuit 113 may select one of the various activation functions based on the function selection signal FS. The AF circuit 113 may generate a result value provided by an activation function selected by the function selection signal FS based on the input distribution signal IDST. The AF circuit 113 may extract a result value corresponding to the input distribution signal IDST from a look-up table to which an activation function selected by the function selection signal FS is applied, thereby outputting the result value as an output distribution signal ODST. A configuration and an operation of the AF circuit 113 will be described with reference to FIGS. 3 to 7.

Figure 2:
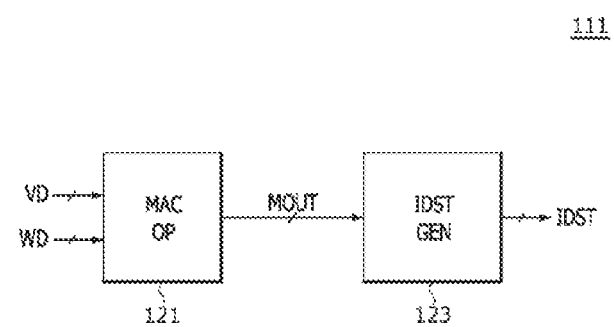
FIG. 2 is a block diagram illustrating a configuration of MAC circuit included in the arithmetic device of FIG. 1.

Referring to FIG. 2, the MAC circuit 111 may include an MAC operator 121 and an input distribution signal generation circuit 123. The MAC operator 121 may receive the vector data VD and the weight data WD and may perform the MAC arithmetic operation including a multiplying operation and an accumulating operation to generate an arithmetic result signal MOUT. The input distribution signal generation circuit 123 may extract only some bits among bits of the arithmetic result signal MOUT to generate the input distribution signal IDST. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 3:
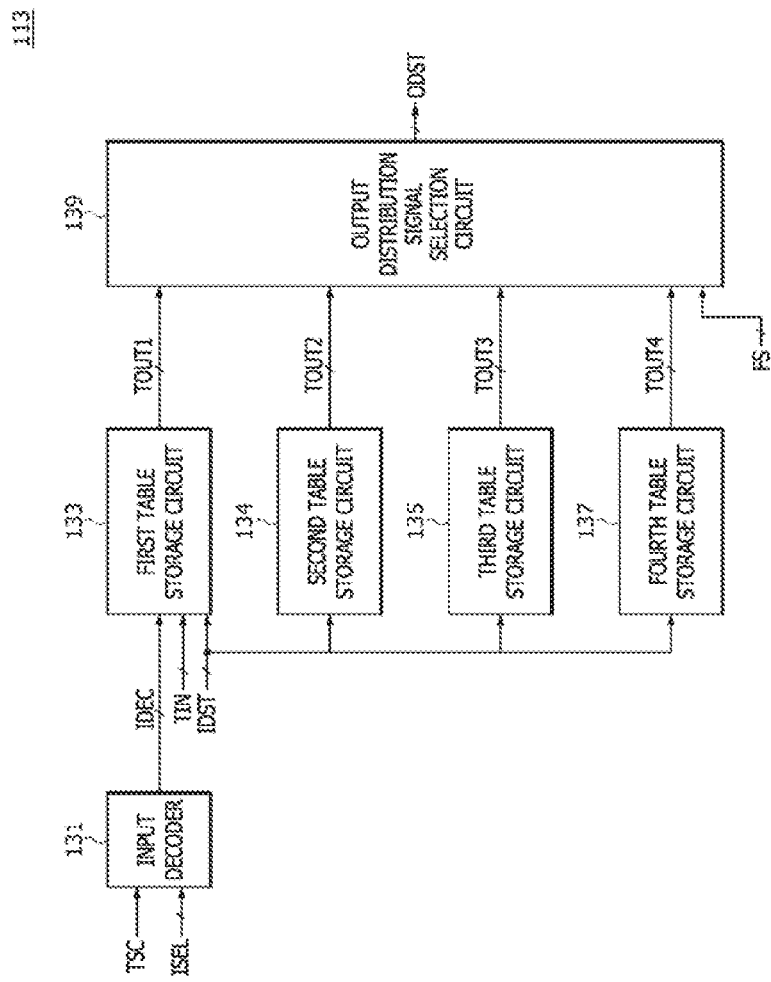
FIG. 3 is a block diagram illustrating a configuration of an AF circuit included in the arithmetic device of FIG. 1.

Referring to FIG. 3, the AF circuit 113 may include an input decoder 131, the first table storage circuit 133, a second table storage circuit 134, a third table storage circuit 135, a fourth table storage circuit 137, and an output distribution signal selection circuit 139.

The input decoder 131 may generate a decoded input signal IDEC based on the table set signal TSC and the input selection signal ISEL. The input decoder 131 may decode the input selection signal ISEL to generate the decoded input signal IDEC when the table set signal TSC is activated.

The first table storage circuit 133 may store the table input signal TIN and may output a first table output signal TOUT1, based on the decoded input signal IDEC and the input distribution signal IDST. The first table storage circuit 133 may store the table input signal TIN as a first activation function having a look-up table form based on the decoded input signal IDEC. The first table storage circuit 133 may output a result value of the first activation function as the first table output signal TOUT1 based on the input distribution signal IDST. A configuration and an operation of the first table storage circuit 133 will be described with reference to FIGS. 4 to 6.

A second activation function may be hardwired into the second table storage circuit 134. The second table storage circuit 134 may include logic circuits implemented in hardware with the second activation function. The second activation function may be set as one of sigmoid, Tanh, ReLU, leaky ReLU, and Maxout. The second table storage circuit 134 may output a result value of the second activation function stored in a look-up table form as a second table output signal TOUT2 based on the input distribution signal IDST. A configuration and an operation of the second table storage circuit 134 will be described with reference to FIG. 7.

A third activation function may be hardwired into the third table storage circuit 135. The third table storage circuit 135 may include logic circuits implemented in hardware with the third activation function. The third activation function may be set as one of sigmoid, Tanh, ReLU, leaky ReLU, and Maxout. The third activation function may be set to be different from the second activation function. The third table storage circuit 135 may output a result value of the third activation function stored in a look-up table form as a third table output signal TOUT3 based on the input distribution signal IDST.

A fourth activation function may be hardwired into the fourth table storage circuit 137. The fourth table storage circuit 137 may include logic circuits implemented in hardware with the fourth activation function. The fourth activation function may be set as one of sigmoid, Tanh, ReLU, leaky ReLU, and Maxout. The fourth activation function may be set to be different from the second and third activation functions. The fourth table storage circuit 137 may output a result value of the fourth activation function stored in a look-up table form as a fourth table output signal TOUT4 based on the input distribution signal IDST.

The output distribution signal selection circuit 139 may generate the output distribution signal ODST from the first table output signal TOUT1, the second table output signal TOUT2, the third table output signal TOUT3, and the fourth table output signal TOUT4 based on the function selection signal FS. The output distribution signal selection circuit 139 may output the first table output signal TOUT1 as the output distribution signal ODST when the function selection signal FS has a first logic level combination. The output distribution signal selection circuit 139 may output the second table output signal TOUT2 as the output distribution signal ODST when the function selection signal FS has a second logic level combination. The output distribution signal selection circuit 139 may output the third table output signal TOUT3 as the output distribution signal ODST when the function selection signal FS has a third logic level combination. The output distribution signal selection circuit 139 may output the fourth table output signal TOUT4 as the output distribution signal ODST when the function selection signal FS has a fourth logic level combination.

Figure 4:
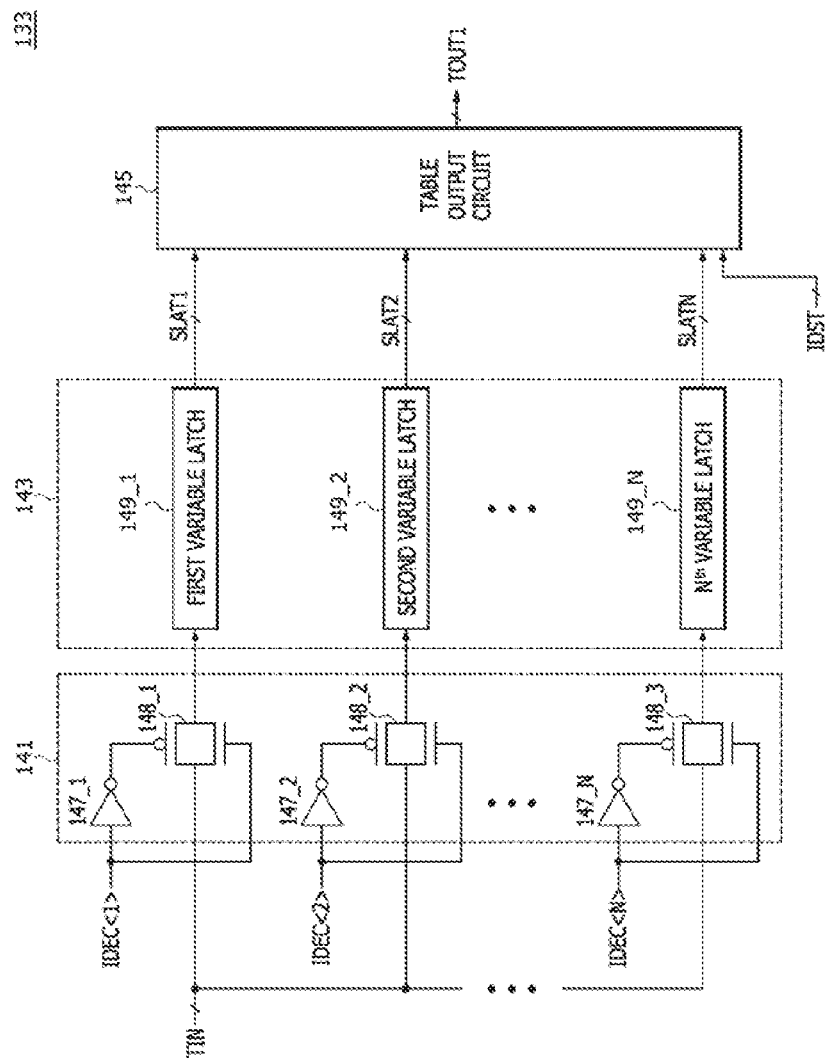
FIG. 4 illustrates a configuration of a first table storage circuit included in the AF circuit of FIG. 3.

Referring to FIG. 4, the first table storage circuit 133 may include a decoded signal input circuit 141, a variable latch circuit 143, and a table output circuit 145.

The decoded signal input circuit 141 may include inverters 147_1~147_N and transfer gates 148_1~148_N. The inverter 147_1 may inversely buffer a first bit signal of the decoded input signal IDEC<1> to output the inversely buffered signal of the first bit signal of the decoded input signal IDEC<1>. The inverter 147_2 may inversely buffer a second bit signal of the decoded input signal IDEC<2> to output the inversely buffered signal of the second bit signal of the decoded input signal IDEC<2>. The inverter 147_N may inversely buffer an $N^{th}$ bit signal of the decoded input signal IDEC<N> to output the inversely buffered signal of the $N^{th}$ bit signal of the decoded input signal IDEC<N>. The transfer gate 148_1 may be turned on to transfer the table input signal TIN to a first variable latch 149_1 when the first bit signal of the decoded input signal IDEC<1> has a logic "high" level. The transfer gate 148_2 may be turned on to transfer the table input signal TIN to a second variable latch 149 . . . 2 when the second bit signal of the decoded input signal IDEC<2> has a logic "high" level. The transfer gate 148_N may be turned on to transfer the table input signal TIN to an $N^{th}$ variable latch 149_N when the $N^{th}$ bit signal of the decoded input signal IDEC<N> has a logic "high" level.

The decoded signal input circuit 141 may transfer the table input signal TIN to the first to $N^{th}$ variable latches 149_1~149_N included in the variable latch circuit 143 based on the decoded input signal IDEC. The decoded signal input circuit 141 may receive the table input signal TIN through a path selected by the decoded input signal IDEC to transfer the table input signal TIN to the first to $N^{th}$ variable latches 149_1~149_N included in the variable latch circuit 143.

The variable latch circuit 143 may include the first to $N^{th}$ variable latches 149_1~149_N. The first variable latch 149_1 may receive and store the table input signal TIN through the transfer gate 148_1 turned on when the first bit signal IDEC<1> of the decoded input signal IDEC has a logic "high" level and may output the stored table input signal TIN as a first variable latch signal SLAT1. The second variable latch 149 . . . 2 may receive and store the table input signal TIN through the transfer gate 148_2 turned on when the second bit signal IDEC<2> of the decoded input signal IDEC has a logic "high" level and may output the stored table input signal TIN as a second variable latch signal SLAT2. The $N^{th}$ variable latch 149_N may receive and store the table input signal TIN through the transfer gate 148_N turned on when the $N^{th}$ bit signal IDEC<N> of the decoded input signal IDEC has a logic "high" level and may output the stored table input signal TIN as an $N^{th}$ variable latch signal SLATN.

The table output circuit 145 may select one of the first to $N^{th}$ variable latch signals SLAT1~SLATN as a result value of the activation function based on the input distribution signal IDST, thereby outputting the selected variable latch signal as the first table output signal TOUT1. The table output circuit 145 may be realized to select one of the first to $N^{th}$ variable latch signals SLAT1~SLATN as the first table output signal TOUT1 according to a logic level combination of the input distribution signal IDST or according to a decoded signal of the input distribution signal IDST. A configuration and an operation of the table output circuit 145 will be described with reference to FIGS. 5 and 6.

Figure 5:
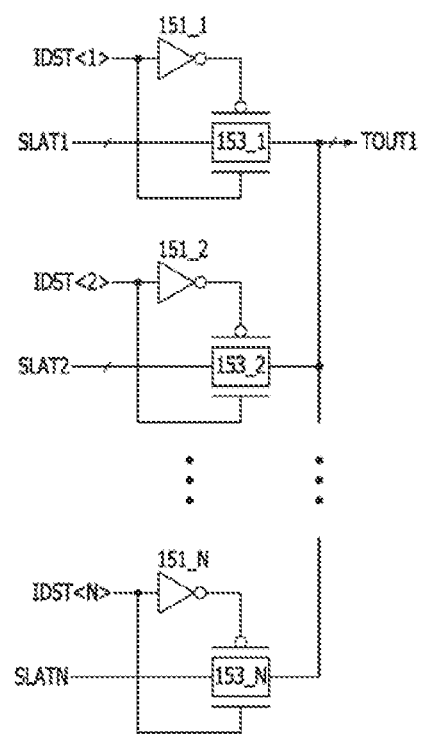
FIGS. 5 and 6 are circuit diagrams illustrating examples of a table output circuit included in the first table storage circuit of FIG. 4.

Referring to FIG. 5, a table output circuit 145a corresponding to an example of the table output circuit 145 may include inverters 151_1, 151_2, . . . , and 151_N and transfer gates 153_1, 153_2, . . . , and 153_N. The inverter 151_1 may inversely buffer a first bit signal of the input distribution signal IDST<1> to output the inversely buffered signal of the first bit signal of the input distribution signal IDST<1>. The inverter 151_2 may inversely buffer a second bit signal of the input distribution signal IDST<2> to output the inversely buffered signal of the second bit signal of the input distribution signal IDST<2>. The inverter 151_N may inversely buffer an $N^{th}$ bit signal of the input distribution signal IDST<N> to output the inversely buffered signal of the $N^{th}$ bit signal of the input distribution signal IDST<N>. The transfer gate 153_1 may be turned on to output the first variable latch signal SLAT1 as the first table output signal TOUT1 when the first bit signal of the input distribution signal IDST<1> has a logic "high" level. The transfer gate 153_2 may be turned on to output the second variable latch signal SLAT2 as the first table output signal TOUT1 when the second bit signal of the input distribution signal IDST<2> has a logic "high" level. The transfer gate 153_N may be turned on to output the $N^{th}$ variable latch signal SLATN as the first table output signal TOUT1 when the $N^{th}$ bit signal of the input distribution signal IDST<N> has a logic "high" level.

Figure 6:
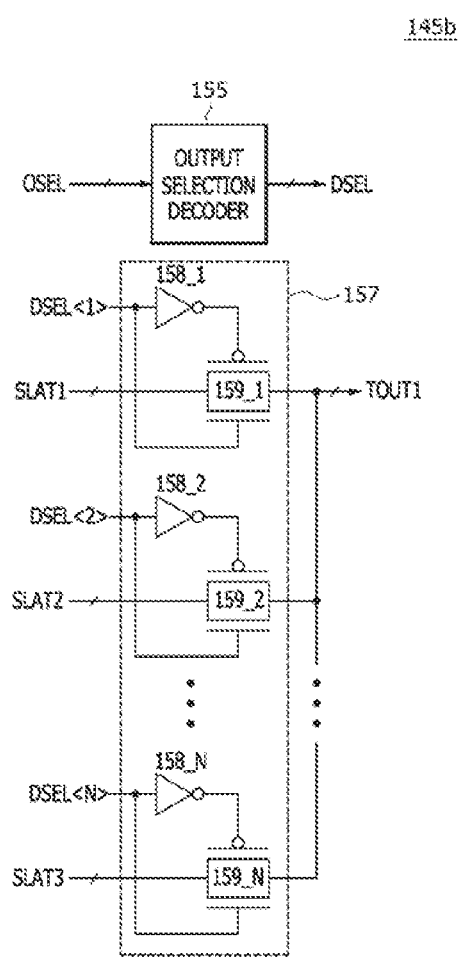

Referring to FIG. 6, a table output circuit 145b corresponding to another example of the table output circuit 145 may include an output selection decoder 155 and a decoded signal output circuit 157. The output selection decoder 155 may decode the input distribution signal IDST to generate a decoded selection signal DSEL. The decoded signal output circuit 157 may include inverters 158_1, 158_2, . . . , and 158_N and transfer gates 159_1, 159_2, . . . , and 159_N. The inverter 158_1 may inversely buffer a first bit signal of the decoded selection signal DSEL<1> to output the inversely buffered signal of the first bit signal of the decoded selection signal DSEL<1>, The inverter 158_2 may inversely buffer a second bit signal of the decoded selection signal DSEL<2> to output the inversely buffered signal of the second bit signal of the decoded selection signal DSEL<2>. The inverter 158_N may inversely buffer an $N^{th}$ bit signal of the decoded selection signal DSEL<N> to output the inversely buffered signal of the $N^{th}$ bit signal of the decoded selection signal DSEL<N>. The transfer gate 159_1 may be turned on to output the first variable latch signal SLAT1 as the first table output signal TOUT1 when the first bit signal of the decoded selection signal DSEL<1> has a logic "high" level. The transfer gate 159_2 may be turned on to output the second variable latch signal SLAT2 as the first table output signal TOUT1 when the second bit signal of the decoded selection signal DSEL<2> has a logic "high" level. The transfer gate 159_N may be turned on to output the $N^{th}$ variable latch signal SLATN as the first table output signal TOUT1 when the $N^{th}$ bit signal of the decoded selection signal DSEL<N> has a logic "high" level.

Figure 7:
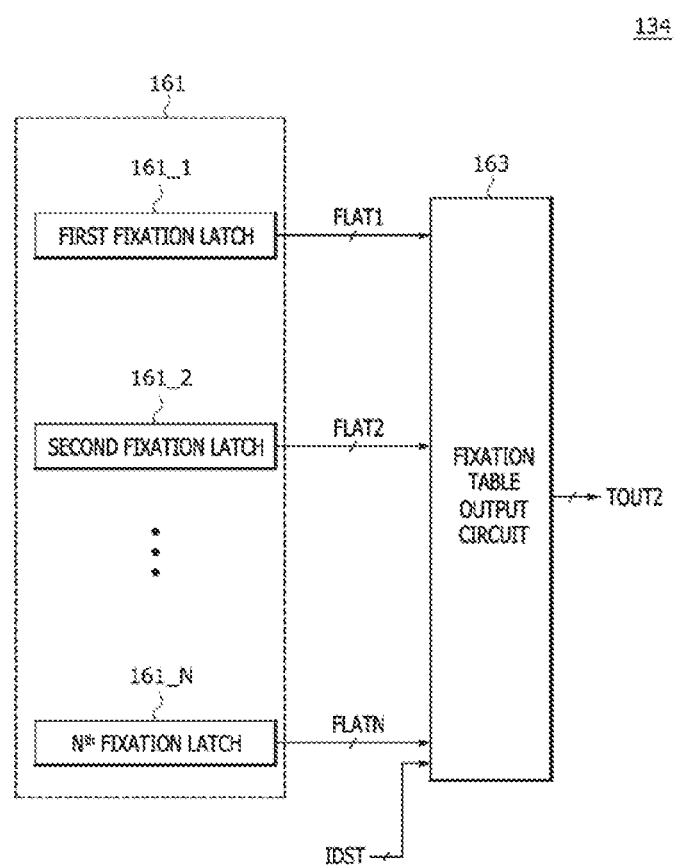
FIG. 7 is a block diagram illustrating a configuration of a second table storage circuit included in the AF circuit of FIG. 3.

Referring to FIG. 7, the second table storage circuit 134 may include a fixation latch circuit 161 and a fixation table output circuit 163. The fixation latch circuit 161 may include first to $N^{th}$ fixation latches 161_1~161_N. A first fixation latch signal FLAT1 may be hardwired in the first fixation latch 161_1 as a hardware. A second fixation latch signal FLAT2 may be hardwired in the second fixation latch 161_2 as a hardware. An $N^{th}$ fixation latch signal FLATN may be hardwired in the $N^{th}$ fixation latch 161_N as a hardware. Each of the first to $N^{th}$ fixation latch signals FLAT1~FLATN stored in the first to $N^{th}$ fixation latches 161_1~161_N may be a result value for storing one of sigmoid, Tanh, ReLU, leaky ReLU, and Maxout in a look-up table form. Logic level combinations of the input distribution signal IDST may be set to correspond to the first to $N^{th}$ fixation latch signals FLAT1~FLATN, respectively. The fixation table output circuit 163 may select one of the first to $N^{th}$ fixation latch signals FLAT1~FLATN as a result value of the activation function based on the input distribution signal IDST, thereby outputting the selected variable latch signal as the second table output signal TOUT2. Each of the third and fourth table storage circuits 25 and 26 illustrated in FIG. 3 may be realized to have the same configuration as the second table storage circuit 134 illustrated in FIG. 7.

The arithmetic device 100 having an aforementioned configuration may receive information on the activation function used for a neural network as a command and an address to store the information in a look-up table form. Thus, various activation functions set to be different from each other may be applied to the neural network without any design changes.

Figure 8:
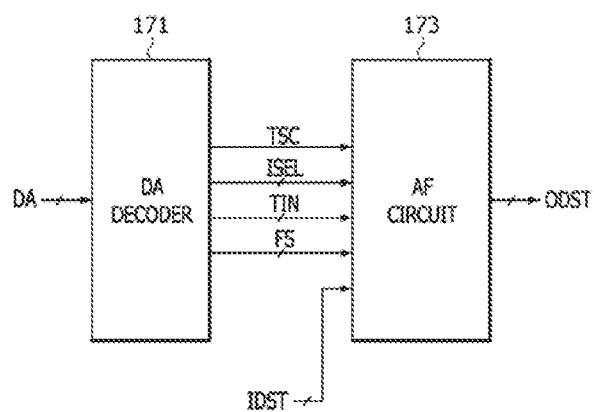
FIG. 8 is a block diagram illustrating a configuration of an arithmetic device according to another embodiment of the present disclosure.

Referring to FIG. 8, an arithmetic device 100*a* according to another embodiment may include an external data decoder 171 and an AF circuit 173.

The external data decoder 171 may receive external data DA to set and output a table set signal TSC, an input selection signal ISEL, a table input signal TIN, and a function selection signal FS. The external data decoder 171 may generate the table set signal TSC, the input selection signal ISEL, the table input signal TIN, and the function selection signal FS from the external data DA which are sequentially inputted to the external data decoder 171.

The AF circuit 173 may store activation functions used for a neural network in a look-up table form, based on the table set signal TSC, the input selection signal ISEL, and the table input signal TIN. Various activation functions may be hardwired in the AF circuit 173. The AF circuit 173 may output a result value of an activation function, which is selected by the function selection signal FS based on an input distribution signal IDST, as an output distribution signal ODST. A configuration and an operation of the AF circuit 173 may be the same as a configuration and an operation of the AF circuit 113 illustrated in FIG. 1. Thus, descriptions of the AF circuit 173 will be omitted hereinafter.

The arithmetic device 100*a* having the aforementioned configurations may receive information on the activation function used for a neural network as data to store the information in a look-up table form. Thus, various activation functions set to be different from each other may be applied to the neural network without any design changes.

Figure 9:
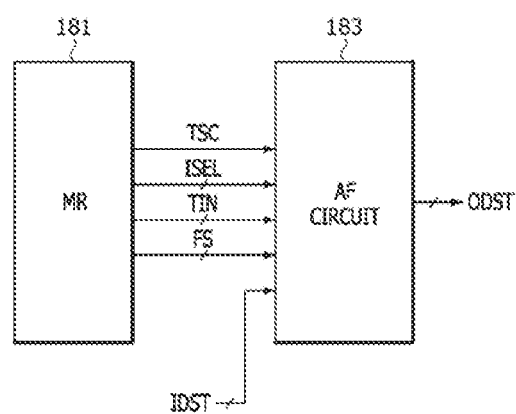
FIG. 9 is a block diagram illustrating a configuration of an arithmetic device according to still another embodiment of the present disclosure.

Referring to FIG. 9, an arithmetic device 100*b* according to still another embodiment may include a mode register 181 and an AF circuit 183.

The mode register 181 may store a table set signal TSC, an input selection signal ISEL, a table input signal TIN, and a function selection signal FS through a mode register set. The mode register 181 may output the table set signal TSC, the input selection signal ISEL, the table input signal TIN, and the function selection signal FS through a mode register read.

The AF circuit 183 may store activation functions used for a neural network in a look-up table form, based on the table set signal TSC, the input selection signal ISEL, and the table input signal TIN. Various activation functions may be hardwired in the AF circuit 183. The AF circuit 183 may output a result value of an activation function, which is selected by the function selection signal FS based on an input distribution signal IDST, as an output distribution signal ODST. A configuration and an operation of the AF circuit 183 may be the same as a configuration and an operation of the AF circuit 113 illustrated in FIG. 1. Thus, descriptions of the AF circuit 183 will be omitted hereinafter.

The arithmetic device 100*b* having the aforementioned configurations may store information on the activation function used for a neural network in a look-up table form based on information stored in the mode register 181. Thus, various activation functions set to be different from each other may be applied to the neural network without any design changes.

The arithmetic device 100 illustrated in FIG. 1, the arithmetic device 100*a* illustrated in FIG. 8, and the arithmetic device 100*b* illustrated in FIG. 9 can be included in memory modules that receive the external command through hosts and memory controllers, Memory modules can be implemented as single in-line memory module (SIMM), dual inline memory module (DIMM), and high bandwidth memory (HBM).

Figure 10:
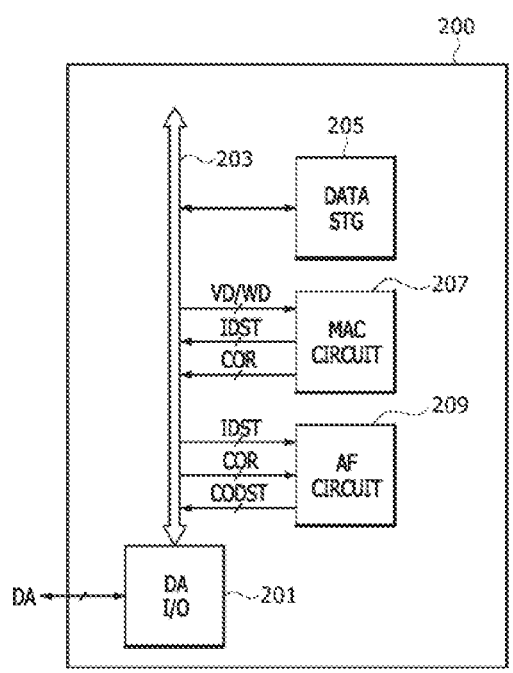
FIG. 10 is a block diagram illustrating a configuration of an arithmetic device according to still another embodiment of the present disclosure.

As illustrated in FIG. 10, an arithmetic device 200 may include a data input/output circuit 201, a data line 203, a data storage circuit 205, a MAC circuit 207 and an AF circuit 209.

The data input/output circuit 201 may receive external data DA from the external side of the arithmetic device 13, and transmit the external data DA to at least one of the data storage circuit 205 and the MAC circuit 207 through the data line 203. The data input/output circuit 201 may output data from at least one of the data storage circuit 205, the MAC circuit 207 and the AF circuit 209 through the data line 203 to the external data DA.

The data storage circuit 205 may be stored internally by receiving the external data DA received from the data input/output circuit 201 through the data line 203 in a write operation. The data storage circuit 205 may transmit the data stored internally to the data input/output circuit 201 through the data line 203 and output it to the external data DA in a read operation.

The MAC circuit 207 may receive vector data VD and weight data WD. The MAC circuit 207 may receive the vector data VD from the data input/output circuit 201 or data storage circuit 205. The MAC circuit 207 may receive the weight data WD from the data input/output circuit 201 or data storage circuit 205. The MAC circuit 207 may perform MAC arithmetic operation on the vector data VD and the weight data WD, and generate an input distribution signal IDST and a compensation signal COR based on the results of MAC arithmetic operation. The MAC circuit 207 may receive a compensated distribution signal CODST from the AF circuit 209 as the vector data VD when multiple layers are applied in perceptron.

The AF circuit 209 may store the activation functions used for a neural network in a look-up table form. The lookup table stored in the AF circuit 209 includes information on the relationship between the input distribution signal IDST and the output distribution signal ODST. The output distribution signal ODST can be defined as the value derived when the input distribution signal IDST is applied to an activation function. Various activation functions used for a neural network, for example, sigmoid, Tanh, ReLU, leaky ReLU, and Maxout may be hardwired into the AF circuit 209. The number of the activation functions hardwired in the AF circuit 209 may be set to be different according to the embodiments.

The AF circuit 209 may generate the compensated distribution signal CODST based on the input distribution signal IDST and the compensation signal COR. The AF circuit 209 may generate a first output distribution signal ODST1 and a second output distribution signal ODST2 based on the input distribution signal IDST using the internally stored the activation function. The AF circuit 209 may generate the compensated distribution signal CODST by compensating the first output distribution signal ODST1 based on the compensation signal COR, the first output distribution signal ODST1 and the second output distribution signal ODST2.

Figure 11:
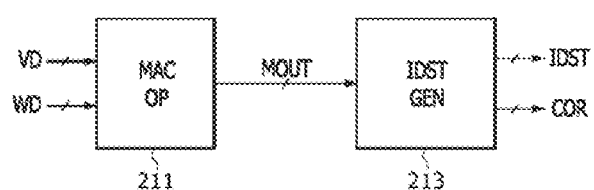
FIG. 11 is a block diagram illustrating a configuration of a MAC circuit included in the arithmetic device of FIG. 10.

Referring to FIG. 11, the MAC circuit 207 may include an MAC operator 211 and an input distribution signal generation circuit 213. The MAC operator 211 may receive the vector data VD and the weight data WD and may perform the MAC arithmetic operation including a multiplying operation and an accumulating operation to generate an arithmetic result signal MOUT. The input distribution signal generation circuit 213 may extract only some bits among bits of the arithmetic result signal MOUT to generate the input distribution signal IDST and the compensation signal COR. For example, when the arithmetic result signal MOUT contains bits corresponding to the integer and bits corresponding to the decimal part, the input distribution signal IDST can be selected as the bits corresponding to the integer from among the bits contained in the arithmetic result signal MOUT, and the compensation signal COR can be selected as the bits corresponding to the integer from among the bits contained in the arithmetic result signal MOUT. The number of bits of the arithmetic result signal MOUT may be set to be different according to the embodiments. In addition, the number of bits of the input distribution signal IDST may also be set to be different according to the embodiments. The number of bits of the input distribution signal IDST may be set to be less than the number of bits of the arithmetic result signal MOUT.

Figure 12:
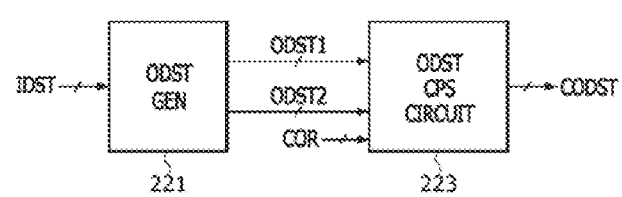
FIG. 12 is a block diagram illustrating a configuration of an AF circuit included in the arithmetic device of FIG. 10.

Referring to FIG. 12, the AF circuit 209 may include an output distribution signal generation circuit 221, and an output distribution signal compensation circuit 223.

The output distribution signal generation circuit 221 may generate a first output distribution signal ODST1 and a second output distribution signal ODST2 based on the input distribution signal IDST. The output distribution signal generation circuit 221 may store the activation function in a look-up table. The output distribution signal generation circuit 221 may apply the input distribution signal IDST to the activation function to generate the first output distribution signal ODST1. The output distribution signal generation circuit 221 may apply a value, the value obtained by adding a predetermined value to the input distribution signal IDST, to the activation function to generate the second output distribution signal ODST2.

The output distribution signal compensation circuit 223 may generate a compensated distribution signal CODST based on the first output distribution signal ODST1, the second output distribution signal ODST2, and the compensation signal COR, The output distribution signal compensation circuit 223 may generate the compensated distribution signal CODST by multiplying the value of the compensation signal COR and the value of the difference between the first output distribution signal ODST1 and the second output distribution signal ODST2. Since the output distribution signal compensation circuit 223 compensates for the first output distribution signal ODST1 based on the compensation signal COR to generate the compensated distribution signal CODST, accuracy of the activation function may be improved.

Figure 13:
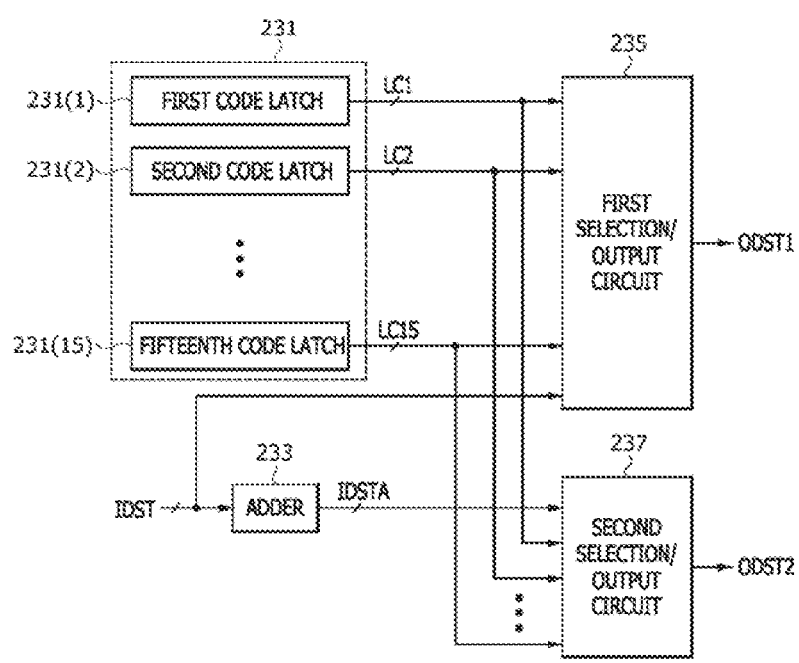
FIG. 13 is a block diagram illustrating a configuration of an output distribution signal generation circuit included in the AF circuit of FIG. 12.

As illustrated in FIG. 13, the output distribution signal generation circuit 221 may include a code latch circuit 231, an adder 233, a first selection/output circuit 235, and a second selection/output circuit 237.

The code latch circuit 231 may include a first to fifteenth code latches 231(1:15) and may store the activation function in a look-up table. The first code latch 231(1) may latch and output a first latch code LC1, the second code latch 231(2) may latch and output a second latch code LC2, and so on and so forth.

The adder 233 may add a predetermined value to the input distribution signal IDST to generate an added input distribution signal IDSTA. The adder 233 may add a binary number '1' to the input distribution signal IDST to generate the added input distribution signal IDSTA. For example, when the input distribution signal IDST<4:1> is set as a binary code of '1001', the added input distribution signal IDSTA<4:1> may be generated to have a binary code of '1010'. In some embodiments, the predetermined value added to the input distribution signal IDST may be set as the binary number of '10'.

The first selection/output circuit 235 may select and output one of the first to fifteenth latch codes LC1~LC15 as the first output distribution signal ODST1 based on the input distribution signal IDST. The first selection/output circuit 235 may select and output a code corresponding to a logic level combination of the input distribution signal IDST, among the first to fifteenth latch code LC1~LC15, as the first output distribution signal ODST1 according to the activation function.

The second selection/output circuit 237 may select and output one of the first to fifteenth latch code LC1~LC15 as the second output distribution signal ODST2 based on the added input distribution signal IDSTA. The second selection/output circuit 237 may select and output a code corresponding to a logic level combination of the added input distribution signal IDSTA, among the first to fifteenth latch code LC1~LC15, as the second output distribution signal ODST2 according to the activation function.

Referring to FIG. 14, set values of an output selection signal ODST, selected by logic level combinations of the input distribution signal IDST<4:1>, according to the activation function, are listed in a look-up table. The set value of the output selection signal ODST may be 'Y1' when the logic level combination of the input distribution signal IDST<4:1> has a binary number of '0001' (corresponding to a decimal number of '1'), and the set value of the output selection signal ODST may be 'Y2' when the logic level combination of the input distribution signal IDST<4:1> has a binary number of '0010' (corresponding to a decimal number of '2'). In addition, the set value of the output selection signal ODST may be 'Y9' when the logic level combination of the input distribution signal IDST<4:1> has a binary number of '1001' (corresponding to a decimal number of '9'), and the set value of the output selection signal ODST may be 'Y10' when the logic level combination of the input distribution signal IDST<4:1> has a binary number of '1010' (corresponding to a decimal number of '10'). Moreover, the set value of the output selection signal ODST may be 'Y15' when the logic level combination of the input distribution signal IDST<4:1> has a binary number of '1111' (corresponding to a decimal number of '15'). The value of 'Y1' may be a set value of the first latch code LC1, and the value of 'Y2' may be a set value of the second latch code LC2. In addition, the value of 'Y9' may be a set value of the ninth latch code LC9, and the value of 'Y10' may be a set value of the tenth latch code LC10. Moreover, the value of 'Y15' may be a set value of the fifteenth latch code LC15. When the logic level combination of the input distribution signal IDST<4:1> has a binary number of '1001' (corresponding to a decimal number of '9'), the added input distribution signal IDSTA<4:1>, outputted from the adder 233, may be set as a binary number of '1010'. In such a case, the first output distribution signal ODST1, outputted from the first selection/output circuit 235 according to the input distribution signal IDST<4:1>, may be 'Y9', and second output distribution signal ODST2, outputted from the second selection/output circuit 237 according to the added input distribution signal IDSTA<4:1>, may be 'Y10'. In this embodiment, the input distribution signal IDST contains 4 bits is only an example and is not limited to that. The combination of set values Y1-Y15 set by the output selection signal ODST and latch codes LC1-LC15 can vary depending on the number of bits contained in the input distribution signal IDST.

Figure 15:
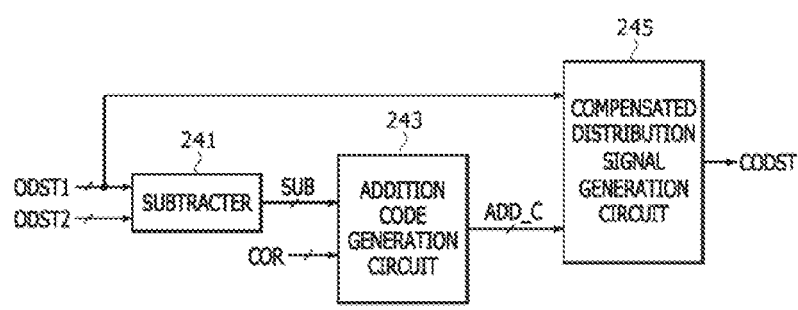
FIG. 15 is a block diagram illustrating a configuration of an output distribution signal compensation circuit included in the AF circuit of FIG. 12.

As illustrated in FIG. 15, the output distribution signal compensation circuit 223 may include a subtractor 241, an addition code generation circuit 243, and a compensated distribution signal generation circuit 245.

The subtractor 241 may subtract the first output distribution signal ODST1 from the second output distribution signal ODST2 to generate a subtraction code SUB. The subtraction code SUB may be generated to have a logic level combination corresponding to the difference between the first output distribution signal ODST1 and the second output distribution signal ODST2. For example, when the difference between the first output distribution signal ODST1 and the second output distribution signal ODST2 is a decimal number of '4', the subtraction code SUB may be generated to have a logic level combination corresponding to the binary number of '100'.

The addition code generation circuit 243 may generate an addition code ADD_C based on the subtraction code SUB and the compensation signal COR. The addition code generation circuit 243 may multiply the subtraction code SUB by a compensation value, is the compensation value being set by the compensation signal COR, to generate a subtraction/compensation value. The addition code generation circuit 243 may generate the addition code ADD_C having a logic level combination corresponding to an integer selected by the subtraction/compensation value. The compensation value set by the compensation signal COR may set the total number of logic level combinations of the compensation signal COR as its denominator and may set the value corresponding to a logic level combination of the compensation signal COR as its numerator. The addition code ADD_C may be set to have a logic level combination corresponding to an integer included in the subtraction/compensation value. For example, when the subtraction/compensation value has a value of '1.5', the addition code ADD_C may be set to have a logic level combination of '01', corresponding to an integer of '1'. In some embodiments, the addition code ADD_C may be set to have a logic level combination corresponding to an integer obtained by raising fractions (not lower than 0.5) of the subtraction/compensation value to a unit. For example, when the subtraction/compensation value has a value of '1.5', the addition code ADD_C may be set to have a logic level combination of '10', corresponding to an integer of '2'.

The compensated distribution signal generation circuit 245 may add the addition code ADD_C to the first output distribution signal ODST1 to generate the compensated distribution signal CODST. For example, when the first output distribution signal ODST1 has a logic level combination of '10' and the addition code ADD_C has a value of '1', the compensated distribution signal CODST may be set to have a logic level combination of '11'.

Figure 16:
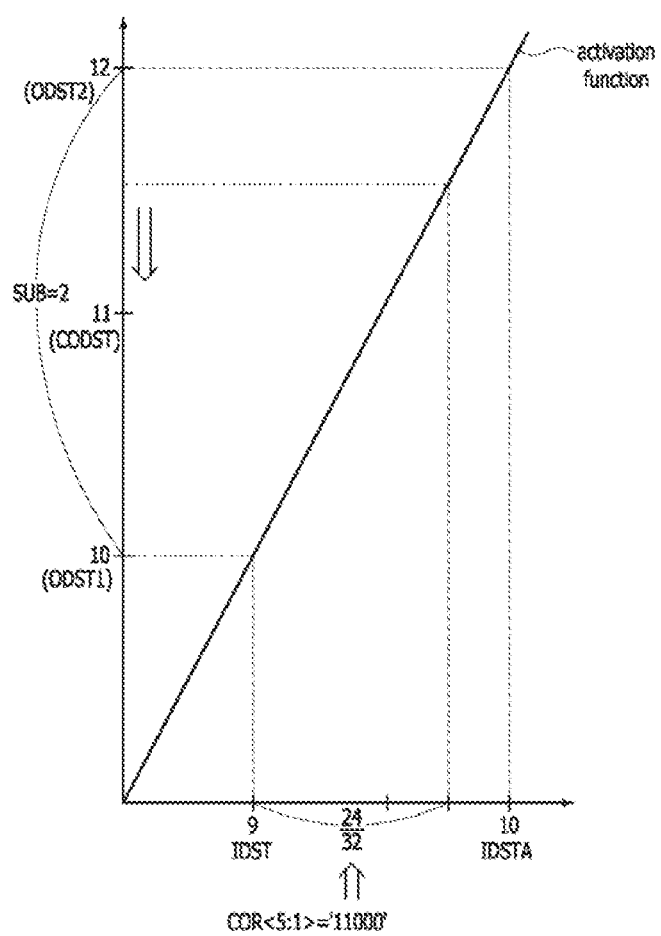
FIG. 16 is a graph, illustrating an operation of the output distribution signal compensation circuit, shown in FIG. 15.

FIG. 16 is a graph illustrating an operation of the output distribution signal compensation circuit 223. In the graph of FIG. 16, the abscissa denotes values of the input distribution signal IDST and the added input distribution signal IDSTA, and the ordinate denotes values of the first output distribution signal ODST1, the second output distribution signal ODST2, and the compensated distribution signal CODST. An operation for generating the compensated distribution signal CODST will be described hereinafter with reference to FIG. 16 in conjunction with a case that the input distribution signal IDST has a value of '9' and the added input distribution signal IDSTA has a value of '10'.

In the embodiment, the first output distribution signal ODST1 may be generated to have a value of '10' according to the activation function when the input distribution signal IDST has a value of '9', and the second output distribution signal ODST2 may be generated to have a value of '12' according to the activation function when the added input distribution signal IDSTA has a value of '10'. Thus, the subtraction code SUB may be set as '2'. When the compensation signal COR has a value of '11000', the compensation value may be set as '24/32'. Accordingly, because subtraction code SUB has a value of '2', the subtraction/compensation value may be calculated by a formula "2×24/32=48/32=1+16/32". Because the addition code ADD_C is set as an integer part of the subtraction/compensation value, the addition code ADD_C may have a value of '1'. The compensated distribution signal CODST may be set as a value of '11' corresponding to a value obtained by adding the addition code ADD_C to the first output distribution signal ODST1.

As described above, the arithmetic device 200 may generate the compensated distribution signal CODST by adding the addition code ADD_C, generated according to the compensation signal COR, to the first output distribution signal ODST1, selected and outputted according to the input distribution signal IDST along the activation function. Thus, the accuracy of the activation function may be improved.

What is claimed is:

1. An arithmetic device comprising:
    an input distribution signal generation circuit configured to receive a first electrical signal including an arithmetic result signal and propagate the first electrical signal through the input distribution signal generation circuit to generate an input distribution signal and a compensation signal based on the arithmetic result signal generated from a result of a multiplying-accumulating (MAC) calculation;
    an output distribution signal generation circuit configured to receive a second electrical signal including the input distribution signal and propagate the second electrical signal through the output distribution signal generation circuit to apply the input distribution signal to an activation function to generate a first output distribution signal and a second output distribution signal; and
    an output distribution signal compensation circuit configured to receive a third electrical signal including the first and second output distribution signals and the compensation signal and propagate the third electrical signal through the output distribution signal compensation circuit to compensate for the first output distribution signal based on the compensation signal, the first output distribution signal, and the second output distribution signal to generate a compensated distribution signal.

2. The arithmetic device of claim 1,
wherein the input distribution signal generation circuit receives vector data from one of a data input/output circuit, a data storage circuit and the output distribution signal compensation circuit, and
wherein the vector data contains information about features contained in an input layer used for a neural network.

3. The arithmetic device of claim 2,
wherein the input distribution signal generation circuit receives weight data from one of a data input/output circuit and a data storage circuit, and
wherein the weight data contains information about an influence on classifying features of input layers as results contained in an output layers used for a neural network.

4. The arithmetic device of claim 1,
wherein the input distribution signal generation circuit selects the input distribution signal as bits corresponding to an integer from among bits contained in the arithmetic result signal, and
wherein the input distribution signal generation circuit selects the compensation signal as bits corresponding to a decimal from among bits contained in the arithmetic result signal.

5. The arithmetic device of claim 1, wherein the output distribution signal generation circuit is configured to store the activation function in a look-up table, configured to apply the input distribution signal to the activation function to generate the first output distribution signal, and configured to generate the second output distribution signal by applying an added input distribution signal to the activation function, which is generated by adding a predetermined value to the input distribution signal.

6. The arithmetic device of claim 5, wherein the output distribution signal generation circuit includes:
a code latch circuit configured to latch and output a plurality of latch codes;
a first selection/output circuit configured to select and output one of the plurality of latch codes as the first output distribution signal based on the input distribution signal; and
a second selection/output circuit configured to select and output one of the plurality of latch codes as the second output distribution signal based on the added input distribution signal.

7. The arithmetic device of claim 1, wherein the output distribution signal compensation circuit is configured to generate a subtraction code based on the first output distribution signal and the second output distribution signal and configured to generate the compensated distribution signal based on a result of a multiplication of the subtraction code and a compensation value set by the compensation signal.

8. The arithmetic device of claim 7, wherein the compensation value, set by the compensation signal, set a total number of logic level combinations of the compensation signal as a denominator of the compensation value and set a value corresponding to a logic level combination of the compensation signal as a numerator of the compensation value.

9. The arithmetic device of claim 7, wherein the output distribution signal compensation circuit includes:
a substractor circuit configured to subtract the first output distribution signal from the second output distribution signal to generate the subtraction code;
an addition code generation circuit configured to multiply the compensation value of the compensation signal by the subtraction code to generate a subtraction/compensation value and configured to generate an addition code corresponding to an integer selected by the subtraction/compensation value; and
a compensated distribution signal generation circuit configured to add the addition code to the first output distribution signal to generate the compensated distribution signal.

10. The arithmetic device of claim 9, wherein the addition code is set as a logic level combination corresponding to an integer component of the subtraction/compensation value.

11. An arithmetic device comprising:
a multiplying-accumulating (MAC) circuit configured to be allocated to a bank, configured to perform a MAC calculation to generate an electrical signal including an input distribution signal and a compensation signal and propagate the electrical signal through the MAC circuit to output the electrical signal; and
an activation function (AF) circuit configured to receive the electrical signal and propagate the electrical signal through the AF circuit to apply the input distribution signal to an activation function to generate an output distribution signal, and configured to compensate for the output distribution signal based on the compensation signal to generate a compensated distribution signal.

12. The arithmetic device of claim 11,
wherein the MAC circuit receives vector data from one of a data input/output circuit, a data storage circuit and the AF circuit, and
wherein the MAC circuit receives weight data from one of the data input/output circuit and the data storage circuit.

13. The arithmetic device of claim 11, wherein the AF circuit includes:
an output distribution signal generation circuit configured to apply the input distribution signal to the activation function to generate a first output distribution signal and a second output distribution signal; and
an output distribution signal compensation circuit configured to compensate for the first output distribution signal based on the compensation signal, the first output distribution signal, and the second output distribution signal to generate the compensated distribution signal.

14. The arithmetic device of claim 13, wherein the MAC circuit selects the input distribution signal as bits corresponding to an integer from among bits contained in an arithmetic result signal, and
wherein the MAC circuit selects the compensation signal as bits corresponding to a decimal from among bits contained in the arithmetic result signal.

15. The arithmetic device of claim 13, wherein the output distribution signal generation circuit is configured to store the activation function in a look-up table, configured to apply the input distribution signal to the activation function to generate the first output distribution signal, and configured to generate the second output distribution signal by applying an added input distribution signal to the activation function, which is generated by adding a predetermined value to the input distribution signal.

16. The arithmetic device of claim 13, wherein the output distribution signal compensation circuit is configured to generate a subtraction code based on the first output distribution signal and the second output distribution signal and configured to generate the compensated distribution signal based on a result of a multiplication of the subtraction code and a compensation value set by the compensation signal.

17. An arithmetic device comprising:

an output distribution signal generation circuit configured to receive a first electrical signal including an input distribution signal and propagate the first electrical signal through the output distribution signal generation circuit to apply the input distribution signal to an activation function to generate a first output distribution signal and a second output distribution signal; and an output distribution signal compensation circuit configured to receive a second electrical signal including the first and second output distribution signals and propagate the second electrical signal through the output distribution signal compensation circuit to compensate for the first output distribution signal based on a compensation signal, the first output distribution signal, and the second output distribution signal to generate a compensated distribution signal.

18. The arithmetic device of claim 17, wherein the input distribution signal is selected as bits corresponding to an integer from among bits contained in an arithmetic result signal, and wherein the compensation signal is selected as bits corresponding to a decimal from among bits contained in the arithmetic result signal.

19. The arithmetic device of claim 17, wherein the output distribution signal generation circuit is configured to store the activation function in a look-up table, configured to apply the input distribution signal to the activation function to generate the first output distribution signal, and configured to generate the second output distribution signal by applying an added input distribution signal to the activation function, which is generated by adding a predetermined value to the input distribution signal.

20. The arithmetic device of claim 17, wherein the output distribution signal compensation circuit is configured to generate a subtraction code based on the first output distribution signal and the second output distribution signal and configured to generate the compensated distribution signal based on a result of a multiplication of the subtraction code and a compensation value set by the compensation signal.

* * * * *